(No Model.)
J. A. TAYLOR.
ROAD SCRAPER AND CARRIER.
No. 552,936. Patented Jan. 14, 1896.
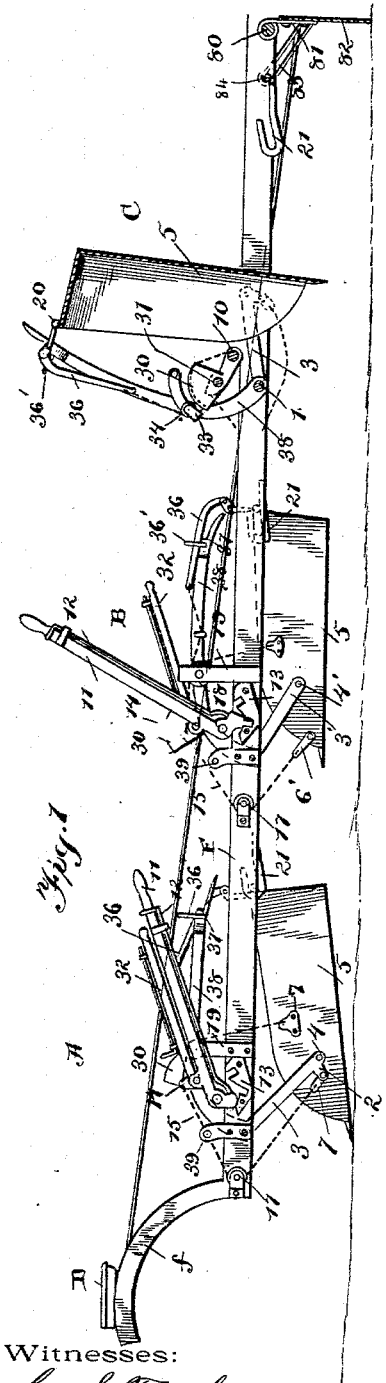
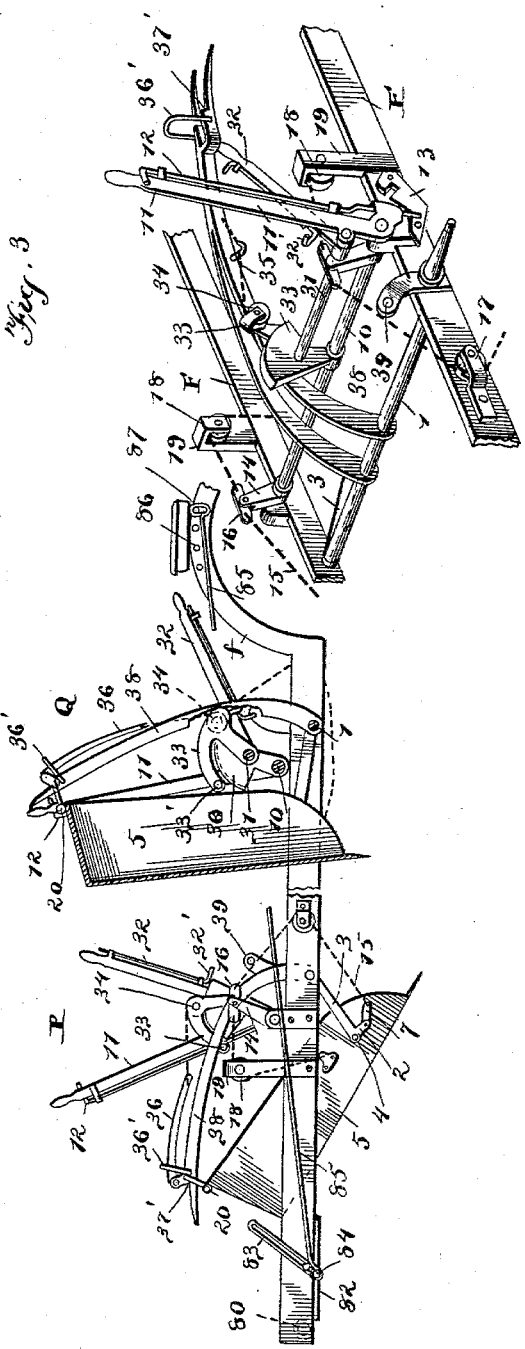
Witnesses:
Geo. E. Frech
J. H. Jochum Jr.
Inventor:
James A. Taylor
by Collamer & Co.,
Attorneys.

UNITED STATES PATENT OFFICE.

JAMES A. TAYLOR, OF LIMA, INDIANA.

ROAD-SCRAPER AND CARRIER.

SPECIFICATION forming part of Letters Patent No. 552,936, dated January 14, 1896.

Application filed May 31, 1895. Serial No. 551,200. (No model.)

*To all whom it may concern:*

Be it known that I, JAMES A. TAYLOR, a citizen of the United States, and a resident of Lima, La Grange county, State of Indiana, have invented certain new and useful Improvements in Road-Scrapers and Carriers, (Case B;) and my preferred manner of carrying out the invention is set forth in the following full, clear, and exact description, terminating with claims particularly specifying the novelty.

This invention relates to road-scrapers and carriers, and more especially to that class thereof known as "self-loading carts;" and the object of the same is to produce improvements in the details of construction of devices of this character.

To this end the invention consists in a road-scraper constructed substantially as hereinafter described and claimed, and as shown in the accompanying drawings.

Reference is made to a companion application filed this day and bearing Serial No. 551,199, wherein is shown, described, and claimed a scraper of slightly different construction than that herein set forth, and a windlass for raising the rear ends of certain scrapers when desired. No claim is made in the present application to the details claimed in said companion application, and vice versa.

Referring to the accompanying drawings, Figure 1 is an elevation of this machine, showing three scrapers as viewed from the left side, the front scraper A being illustrated in the act of scraping, the second scraper B shown in side elevation as raised to a carry and employing a slightly different form of connection between the arms and chains and the scoop, the third scraper C in section, with its forward end still further raised by the main lever and its body completely dumped by the dumping-lever, and the leveling device at the rear of the machine also in section and in operative position. Fig. 2 is a view from the opposite or right side of the machine, showing only two of the three scoops or scrapers, both supported at their forward ends by the main levers, as at B in Fig. 1, the rear scraper P being partly dumped by the dumping-lever, the scraper Q forward of it being shown in section as completely dumped by the dumping-lever, and the leveling device at the rear of the machine in side elevation as drawn up by the driver out of a position to engage the surface of the earth. Fig. 3 is a perspective detail.

In the said drawings, the letter F designates the main framework, comprising side bars supported by a rear axle (not shown) and having an arch *f* at their front ends, under which turn the wheels on the front axle, (also not shown,) and upon this arch is preferably supported the driver's seat D, all these details forming no part of the present invention. The framework is intended to carry three (more or less) scrapers, arranged tandem, and a leveling-board at its rear end, and the whole is to be drawn by a horse or team. The latter is controlled by the driver, who in addition has charge of the leveling-board, while an attendant or additional man controls the raising and lowering of the scrapers.

The numeral 1 designates a shaft or rod extending across the framework, and 3 3 are arms journaled on this rod at one of their ends and having their other ends pivoted, as at 4 4, to the sides of the mouth of the scraper 5, which latter may be of scoop shape, as shown, or of any other appropriate construction. The scraper B is shown as having straight arms 3' simply pivoted to the sides of the scraper at 4', but in other views the arms 3 have rigid elbows 2 near their pivots 4, in the ends of which elbows are pivoted links 6, while ears 7 are secured to the sides of the scrapers, as shown, both for a purpose to appear below. When the straight arms 3' are used, the links 6 are replaced by other ears 6', as seen in Fig. 1 on the scraper B. This, however, is only a trifling modification and forms no essential feature of the general construction.

10 is the main shaft journaled across the framework and carrying at one extremity the main lever 11 having a suitable thumb-lever 12 for engagement with a toothed segment 13 in the usual manner. This shaft has fixed thereto, near its ends, two lugs 14 rising from the shaft; and 15 are two chains connected with the upper ends of the lugs in any suitable manner, (though preferably by links 16, as shown on scraper P,) the forward chains leading over pulleys or sheaves 17 mounted on the side bars, and being connected with the links 6 or ears 6', and the rearward chains leading from the lugs 14 over pulleys or sheaves 18 supported in brackets 19 rising from the side bars, and being connected with the ears 7, thus forming two endless chains connecting the two lugs 14 with the front end of the scraper beneath. Hence when the main lever stands to the rear the front end of the scraper will engage the earth, as seen at A. When the lever is thrown forward partially, the front end of the scraper will be held higher, as seen at B, P, and Q, and may be held horizontal at a carry, as at B, or dumped, as at P and Q, all by the action of the dumping-lever described below; and when the main lever is thrown still farther forward the front end of the scraper is raised still higher.

The rear end of each scraper preferably has laterally-projecting lugs 20 which engage guides 21 secured to the inner faces of the side bars, and the lower sides of said guides extend to the rear farther than the upper sides, so that said lugs may pass to the rear out of the guides, and the rear end of the scraper can rise.

30 is a cam fixed to the center of the main shaft 10; and journaled through this cam and one of the lugs 14 is the dumping-shaft 31 having a dumping-lever 32 secured to one end. To its other end, adjacent the cam 30, is secured a short arm 33 carrying a sheave 34 which moves adjacent the face of the cam when the lever is raised; and 35 is a chain secured beneath the main shaft, passing thence to the rear of the cam 30, then over the sheave, and secured at its rear end to the forward end of a rod 36 that is preferably pivoted to a bail 37 at the center of the rear end of the scoop.

38 is a fork pivoted at its front end on the rod 1, extending thence over the main shaft 10 and alongside the chain 35, where it has a hook 35' to support this chain, then having its forked end 38' passing under the rod 36 and provided with an arch 36' to prevent the rise of such rod, and finally terminating in two pointed tines adapted to enter the bail 37, which tines have shoulders 37' on their upper sides just in rear of the arch 36' for a purpose to appear below. By this construction when the dumping-lever is raised the short arm 33 moves the sheave around the cam 30 and draws on the chain 35, and the latter, through the rod 36, raises the rear end of the scraper, while its forward end turns around the pivots 4 or 4'. Meanwhile the lugs 20, which passed to the rear out of the guides 21 when the main lever was first moved from the position shown at A, find no obstruction to rising.

When the dumping-lever reaches the position shown at P, the tines of the fork 38' have passed into the bail 37 and the shoulders 37' thereon strike against such bail. Thereafter further forward drawing on the chain and rod by means of the dumping-lever causes the rear end of the scraper to turn about the rod 1 as a pivot, (instead about the pivots 4 or 4',) since the forward end of the fork is journaled on that rod, and, as the front end of the scraper is yet supported by the arms 3 or 3', that end also turns about the rod 1. Hence the entire scraper is bodily raised and completely dumped around this rod, as seen at Q.

In order to cause the positive movement of the fork, the short arm 33 has a pendent hook 33' that comes under the body of the fork at the proper moment and raises it. Any suitable means may be employed, if desired, to hold the scraper in this dumped position, although, as it retains it but momentarily, such means may not be necessary or desirable. However, I have shown the scrapers A and P as having their dumping-levers 32 provided with thumb-levers having hooks 32' that may engage eyes 39 carried by the framework at suitable points for this purpose. Each thumb-lever extends along its dumping-lever 32 and has a short handle or thumb-piece adjacent the handle of the lever 32 for use, as is clear.

At the rear end of the machine the framework F has a cross-rod 80, from which is suspended by links 81 a leveling-board 82, hanging normally in a vertical plane, and linked to the extremities of this board are loops 83 sliding over pins 84 in the side bars, so as to guide and steady the movements of the board and prevent its swinging to the rear under the strain incident to its use. Attached to one end of the board is a rod 85 (see Fig. 2) leading to a point near the seat D, wherefrom projects a pin or hook 86, or a number of them, and the rod here has an open handle 87 which may be drawn on to swing the board forward partially or wholly out of scraping position, after which the open handle is engaged over one of the pins 86 to hold the leveling-board at the angle desired.

The operation of this complete machine is as follows: The team is hitched to the forward end of the framework, and the driver takes his seat and drives to the scene of operations. Here another man throws one of the main levers to the rear and thus lowers one scraper onto the ground. Then as the machine is driven forward this scraper takes up earth until it is filled, when the main lever is brought forward to raise the scraper to a carry. Other scrapers are then manipulated, so as to take up their respective loads until all are full and at carry, the leveling-board being meantime lowered by the driver to level off any ground from which all scrapings desired have been taken. The attendant may then ride on the machine, although he preferably descends, and the machine is driven to the dump, where another attendant manipulates the levers, as herein described, to dump the several scrapers and possibly lock them dumped, and the driver then returns with the machine to the scene of work.

If it should happen that earth is to be taken from one place, carried but a short distance, and there dumped, so as to level off uneven ground, the attendant preferably rides upon the machine and works the several levers.

If the ground is very uneven, all but one scraper are raised to the position shown at Q, so as to pass over rises in the earth's surface, and a single remaining scraper is used, as above.

Considerable change may be made in the details of construction without departing from the general principles of my invention.

What is claimed as new is—

1. In a road scraper, the combination with the framework, a scraper therein, and a support for the rear end of the scraper; of a main shaft journaled across the framework and having a lever, pulleys carried by the framework in front and in rear of said shaft, lugs rising from the shaft, and chains extending from the lugs forward and backward over the respective pulleys and connected to the front end of the scraper, as and for the purpose set forth.

2. In a road scraper, the combination with the framework, a scraper therein, a support for the rear end of the scraper, a rod across the framework, and arms pivotally connecting said rod with the front end of the scraper; of a main shaft journaled across the framework and having a lever, pulleys in front and rear in this shaft, lugs rising from the shaft, and chains extending from the lugs forward and backward over the respective pulleys and connected to the front end of the scraper, as and for the purpose set forth.

3. In a road scraper, the combination with the framework, a scraper therein, a support for the rear end of the scraper, means for raising said rear end, a rod across the framework, arms pivoted at their forward ends on said rod and at their rearward ends to the sides of the scraper, such rearward ends having rigid elbows, and ears attached to the sides of the scraper; of a main shaft journaled across the framework and having a lever, lugs on this shaft, links pivoted in the outer ends of the lugs, chains extending rearward from such links to the ears on the scraper, other chains extending from such links forward of the shaft, and links connecting the lower ends of these front chains with said rigid elbows, substantially as herein specified.

4. In a road scraper, the combination with the framework, a scraper therein, and means for raising and lowering its front end; of a dumping shaft having a lever at one end and a short arm at the other, a sheave carried by this arm, a cam adjacent the sheave and around which the latter moves, and a chain secured to a fixed support, passing under the cam and over the sheave, and then connected with the rear end of the scraper, as and for the purpose set forth.

5. In a road scraper, the combination with the framework, a scraper therein pivotally supported at its front end, and a rod pivotally connected to its rear end; of a dumping shaft having a lever and a short arm, a fixed cam adjacent said arm, a sheave carried by the arm and moving around the cam, and a chain secured to a fixed support, passing under the cam and over the sheave, and connected to the front end of said rod, as and for the purpose set forth.

6. In a road scraper, the combination with the framework, a scraper pivotally supported therein, a bail rising from its rear end, and a rod pivoted to said bail; of a fixed cam, a dumping arm carrying a sheave moving around the face of this cam, a chain secured to a fixed support, passing under the cam and over the sheave, and connected to the front end of said rod, and a fork pivoted at one end forward of said cam with its other end adapted to enter said bail when the rear end of the scraper is partially raised, such rear end having a shoulder for engaging with the bail, as and for the purpose set forth.

7. In a road scraper, the combination with the framework, a scraper pivotally supported therein, a bail rising from its rear end, a rod pivoted to said bail, and means for drawing the rod forward; of a rod across the framework, and a fork pivoted at its front end on this rod and having its rear end passing under said pivoted rod and adapted to enter the bail when the rear end of the scraper is partially raised, said fork having a shoulder for engaging with the bail, as and for the purpose set forth.

8. In a road scraper, the combination with the framework, arms depending therefrom, a scraper pivoted near its forward end to the lower ends of the arms, and a bail rising from the rear end of the scraper; of means for turning the scraper around said pivots to partially dump it, a fork whose rear end is adapted to enter said bail, a shoulder on this rear end engaging the bail, and a rod across the framework forward of the pivots of the scraper and upon which the front end of the fork is pivoted, as and for the purpose set forth.

9. In a road scraper, the combination with the framework, a rod across the same, arms pivoted on said rod and inclining to the rear, a scraper pivoted near its front end to the lower ends of the arms, and means for raising and lowering the front end of the scraper; of means for turning the scraper around its pivots to partially dump it, a bail rising from its rear end, a fork pivoted on said rod and having its rear end adapted to enter the bail, and a shoulder on the fork adapted to engage the bail, as and for the purpose set forth.

10. In a road scraper, the combination with the framework, a scraper pivotally supported therein, a main shaft across the framework having a lever, lugs on this shaft, and connections between the lugs and scraper for raising and lowering its front end; of a cam fixed on this shaft, a dumping shaft journaled through the cam and one lug and having a lever, a short arm fixed to the dumping shaft and carrying a sheave moving around the face of the cam, and a chain secured to the main shaft, passing thence under the cam and over the sheave, and connected with the rear end of the scraper, as and for the purpose set forth.

11. In a road scraper, the combination with the framework, a main shaft and a rod across this framework, a scraper pivotally supported from said rod, connections between the shaft and scraper for raising and lowering the latter, and means for turning the shaft; of a cam fixed on the shaft, a dumping shaft journaled through the cam, a short arm fixed to the dumping shaft and carrying a sheave and a hook, a bail at the rear of the scraper, a chain secured to the main shaft, passing thence under the cam and over the sheave, and connected with said bail, and a fork pivoted on said rod, passing over said hook, and having its rear end adapted to enter said bail, as and for the purpose set forth.

12. In a road scraper, the combination with the framework, a main shaft and a rod across this framework, a scraper pivotally supported in the framework, and connections between the shaft and scraper for raising and lowering the latter; of a dumping shaft journaled in bearings carried by the main shaft, a bail at the rear of the scraper, a fork pivoted on said rod with its rear end adapted to enter said bail, an arm fixed on the dumping shaft and having a hook standing under the fork, and connections between this arm and the scraper for dumping it at will, as and for the purpose set forth.

13. In a road scraper, the combination with the framework, a scraper pivotally supported therein, a bail at the rear end of the scraper, a rod pivoted on said bail, and a chain connected with said rod and extending forward to a fixed support; of a dumping shaft, a sheave carried thereby and adapted to deflect this chain from a straight line, a rod across the framework, a fork pivoted on said rod and having its body extending alongside the chain and pivoted rod, under the latter, and adapted to enter said bail for the purpose set forth, a hook on the fork beneath the chain, and a bail on the fork above the pivoted rod, substantially as described.

14. In a road scraper, the combination with the framework having a hook in its side bar, and scrapers carried by such framework; of a rod across the framework, a board hung thereon, means for limiting the rearward swinging of the board, and an operating rod connected with the board, leading forward, and having an open handle adapted to be engaged with said hook, as and for the purpose set forth.

15. In a machine such as described, the combination with the framework having a hook; of a board hung across the framework, loops connected to the board, pins in the framework over which the loops slide, and an operating rod also connected with the board, leading to a remote point, and having an open handle adapted to be engaged with the hook, as and for the purpose set forth.

16. In a machine such as described, the combination with the framework having a cross rod, links pivoted thereon, and a board hung from the links; of pins in the side bars of the framework, loops pivoted to the ends of the board and sliding over said pins to limit the rearward swinging of the board, and means for drawing the board forward when desired, as and for the purpose set forth.

17. In a road scraper, the combination with the framework having an eye in its side bar, a scraper in said framework, and means for supporting its forward end; of a dumping lever pivotally connected with the framework, connections between this lever and the rear end of the scraper, a thumb-lever journaled along the dumping lever and having a thumb-piece at one end, and a hook at the other end thereof adapted to engage said eye when the scraper is dumped, substantially as specified.

In testimony whereof I have hereunto subscribed my signature on this the 22d day of May, A. D. 1895.

JAMES A. TAYLOR.

Witnesses:
CHAS. S. NICHOLS,
ARTHUR L. YEAGLA.